(12) United States Patent
Gupta et al.

(10) Patent No.: US 12,073,381 B2
(45) Date of Patent: *Aug. 27, 2024

(54) TRANSACTION TOKEN THAT STORES AND PRESENTS LOCATION-SPECIFIC TOKEN IDENTIFIERS

(71) Applicant: Capital One Services, LLC, McLean, VA (US)

(72) Inventors: Varun Gupta, Brooklyn, NY (US); Amanda Sneider, New York, NY (US); Allison Fenichel, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,093

(22) Filed: May 4, 2023

(65) Prior Publication Data

US 2023/0274255 A1 Aug. 31, 2023

Related U.S. Application Data

(63) Continuation of application No. 17/193,874, filed on Mar. 5, 2021, now Pat. No. 11,663,580.

(51) Int. Cl.
*G06Q 20/34* (2012.01)
*G06K 19/077* (2006.01)
(Continued)

(52) U.S. Cl.
CPC ..... *G06Q 20/341* (2013.01); *G06K 19/07707* (2013.01); *G06Q 20/105* (2013.01);
(Continued)

(58) Field of Classification Search
CPC .. G06Q 20/341; G06Q 20/105; G06Q 20/352; G06Q 20/3572; G06Q 20/3574; G06Q 20/4015; G06K 19/07707
See application file for complete search history.

(56) References Cited

U.S. PATENT DOCUMENTS 10,628,821 B2 * 4/2020 Marsh .................. G06Q 20/352
11,663,580 B2 * 5/2023 Gupta ................ G06Q 20/3572
705/41

(Continued)

OTHER PUBLICATIONS

Barker, Katherine J., Jackie D'amato, and Paul Sheridon. "Credit card fraud: awareness and prevention." Journal of financial crime 15.4 (2008): 398-410. (Year: 2008).*

(Continued)

*Primary Examiner* — David P Sharvin
*Assistant Examiner* — Brock E Turk
(74) *Attorney, Agent, or Firm* — Foley & Lardner LLP

(57) ABSTRACT

In certain embodiments, location-based activation of card identifiers may be facilitated. In some embodiments, an electrophoretic display card may store a set of location-specific card identifiers, where each card identifier of the set is associated with (i) an account of a user and (ii) creation location information indicating a device location of the user at a creation time of the card identifier. In response to being powered by a user device, the card may initiate wireless communication with the user device. The card may determine a device location of the user device, select a card identifier from the set of card identifiers that matches the device location, and switch a state of the card identifier to an active state to enable transaction processing for the card identifier. In some embodiments, the card may cause the active card identifier to be presented on an electrophoretic display of the card.

20 Claims, 6 Drawing Sheets

(51) Int. Cl.
*G06Q 20/10* (2012.01)
*G06Q 20/40* (2012.01)

(52) U.S. Cl.
CPC ....... *G06Q 20/352* (2013.01); *G06Q 20/3572* (2013.01); *G06Q 20/3574* (2013.01); *G06Q 20/4015* (2020.05)

(56) References Cited

U.S. PATENT DOCUMENTS

| | | | |
|---|---|---|---|
| 2015/0161643 A1* | 6/2015 | Randell | G06Q 30/0235 705/14.26 |
| 2020/0410314 A1* | 12/2020 | Stahlhut | G07F 7/0833 |
| 2021/0182833 A1* | 6/2021 | Singh | G06K 19/073 |

OTHER PUBLICATIONS

Weinstein, Stephen B. "Smart credit cards: The answer to cashless shopping: Pioneered in France, microprocessor-based credit and debit cards are being used in large-scale tests in three cities there." IEEE spectrum 21.2 (1984): 43-49. (Year: 1984).*

* cited by examiner

TRANSACTION TOKEN THAT STORES AND PRESENTS LOCATION-SPECIFIC TOKEN IDENTIFIERS

CROSS-REFERENCE TO RELATED APPLICATION(S)

This application is a continuation of U.S. patent application Ser. No. 17/193,874, filed Mar. 5, 2021, now issued as U.S. Pat. No. 11,663,580 on May 30, 2023. The content of the foregoing application is incorporated herein in its entirety by reference.

FIELD OF THE INVENTION

The invention relates to creation and storage of a location-specific identifier for location-based transaction processing, including, for example, facilitating storage and presentation of one or more location-specific identifiers on an electrophoretic display card or other card based on a corresponding device location.

BACKGROUND

Recent technological advances have enabled the implementation of multiple category-specific virtual card numbers associated with a user's card account, including, for example, virtual card numbers that are associated with the same user's card account, where each virtual card number is restricted for use with a different entity. Because many data breaches often go undetected for a substantial period of time, such virtual card numbers remain vulnerable to unauthorized use when the entities (to which use of the virtual card numbers is restricted) are known (e.g., when the breach occurs with those entities' systems). In addition, although there are transaction cards with the ability to store and switch between virtual card numbers, it has not been practical to incorporate an electronic display on such transaction cards due to power/battery-related concerns. These and other drawbacks exist.

SUMMARY

Aspects of the invention relate to systems and methods for facilitating presentation of a location-specific card identifier at a card based on a corresponding device location.

In some embodiments, a card may include circuitry, memory, a display, or other components, wherein the card memory stores (i) a set of location-specific card identifiers that are associated with an account of a user and (ii) creation location information indicating a location of the user at a creation time of the location-specific card identifier. A location-specific card identifier may be a card identifier that may be used for performing a transaction at a specific location (e.g., user-defined location, location of a user device at the time of creation of the location-specific card identifier, or other location). In some embodiments, the card circuitry may establish a wireless connection with a user device (e.g., a mobile device, a terminal that powers the card or processes a transaction associated with the card, etc.) and obtain device location information of the user device via the wireless connection from the user device. Based on the device location information of the user device, the card circuitry may select a first location-specific card identifier from the set of location-specific card identifiers and switch the first location-specific card identifier to an active state to enable transaction processing for the first location-specific card identifier. The card circuitry may also cause the first location-specific card identifier to be presented on the card display (e.g., an electrophoretic display).

In some embodiments, where the user device powers the card, the card may modify the pixel presentation of its display to present the first location-specific card identifier during the user device's powering of the card. As an example, where the card has an electrophoretic display, the first location-specific card identifier may continue to remain presented on the display after the user device stops powering the card (e.g., even where the card does not have an internal battery for powering the display). In this way, for example, the appropriate location-specific card identifier may be presented on the card when the card is ready to be used for a transaction (e.g., without requiring a battery to continue to power the display).

Various other aspects, features, and advantages of the inventions will be apparent through the detailed description of the invention and the drawings attached hereto. It is also to be understood that both the foregoing general description and the following detailed description are exemplary and not restrictive of the scope of the inventions. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
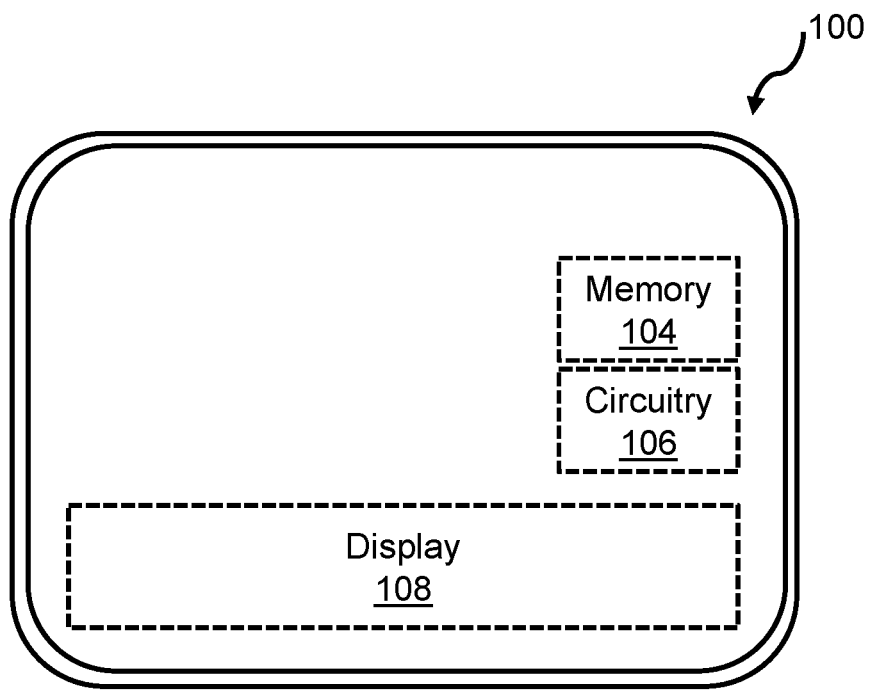
FIG. 1 shows a token, in accordance with one or more embodiments.

FIG. 1 shows a token 100, in accordance with one or more embodiments. In some embodiments, the token 100 select and display a token identifier (e.g., virtual card number or other token identifier) based on device location information of a user device or other location information. In some embodiments, where the user device powers the token 100, the token 100 may modify the pixel presentation of its display to present the selected identifier during the user device's powering of the token 100. As an example, where the token 100 has an electrophoretic display, the selected identifier may continue to remain presented on the display after the user device stops powering the token 100 (e.g., even where the token 100 does not have an internal battery for powering the display). In this way, for example, the appropriate identifier may be presented on the token 100 when the token 100 is ready to be used for a transaction (e.g., without requiring a battery to continue to power the display).

Figure 2:
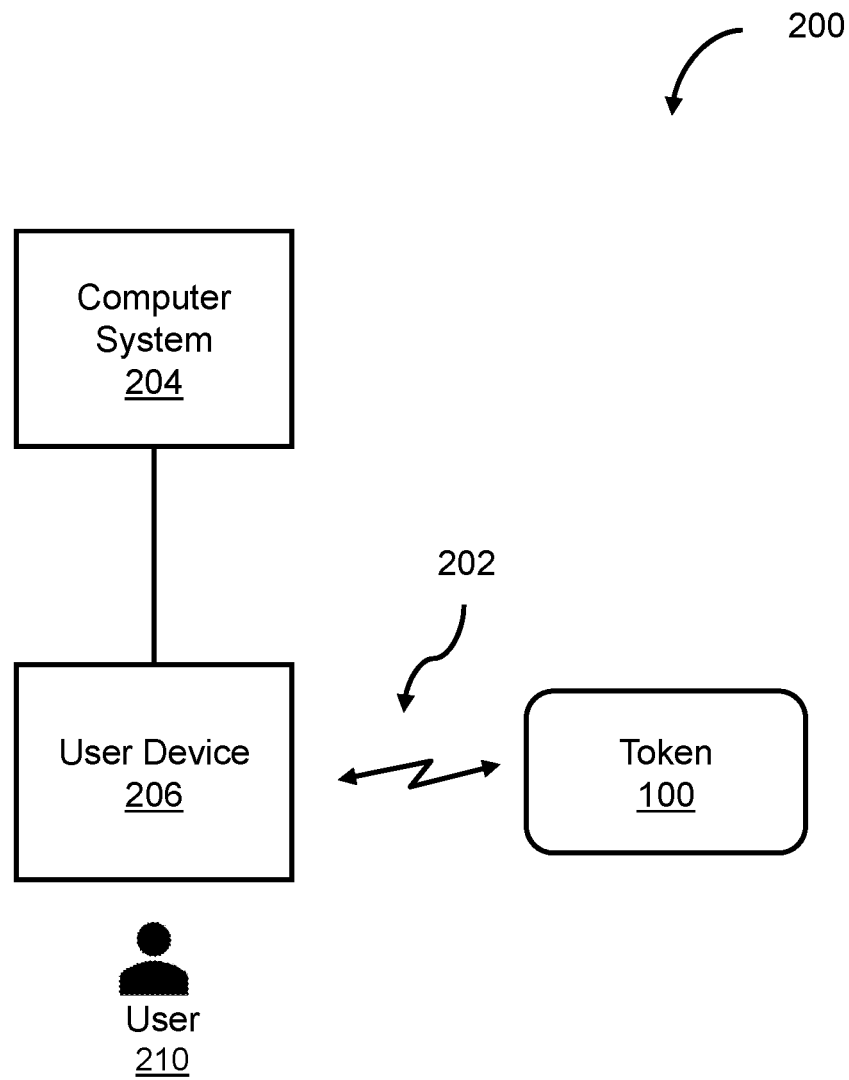
FIG. 2 shows a token management system configured to manage token identifiers associated with a user, in accordance with one or more embodiments.
Figure 3:
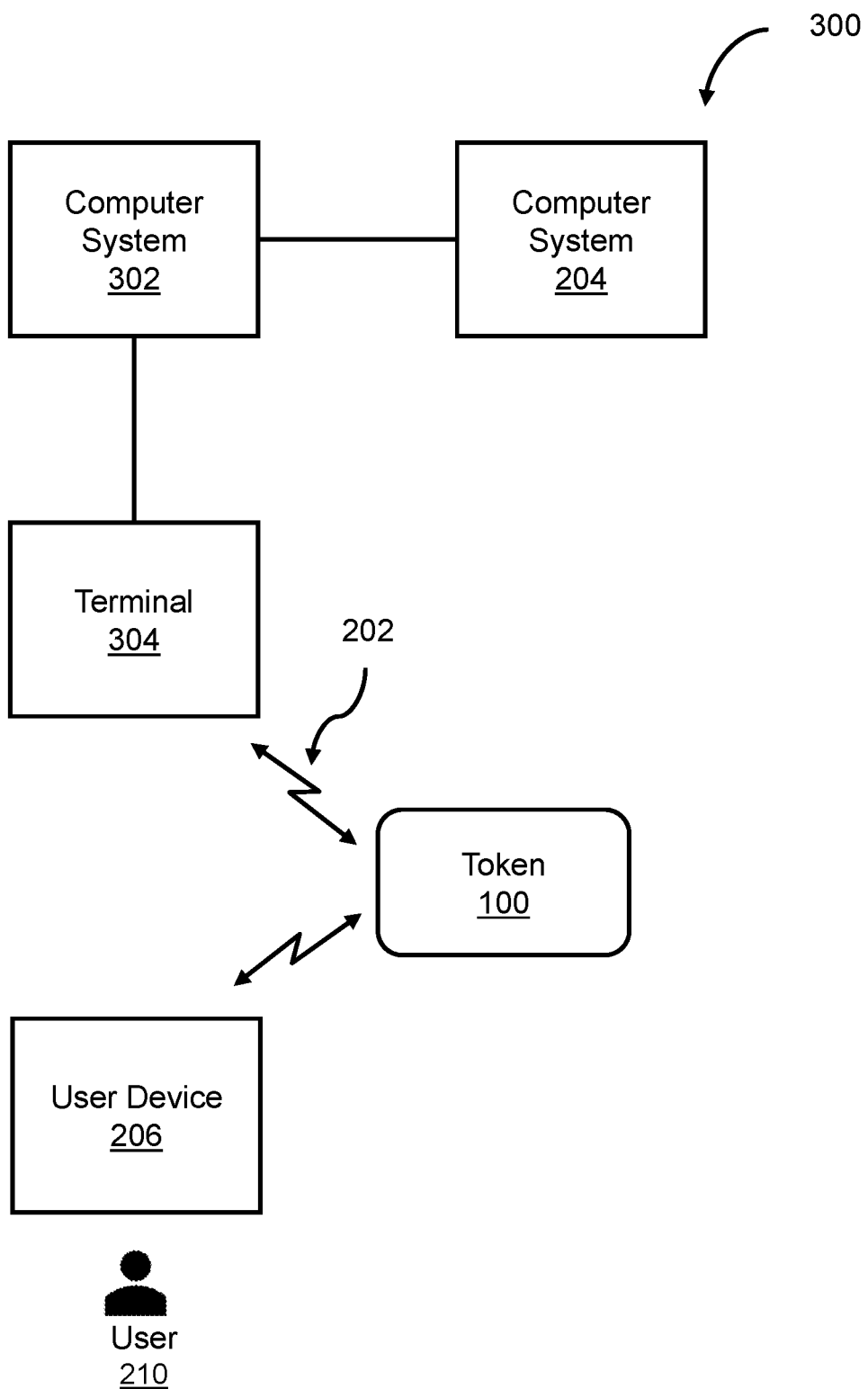
FIG. 3 shows a transaction management system configured to manage processing with token identifiers, in accordance with one or more embodiments.

In some embodiments, the token 100 may be configured to store a set of token identifiers that are each associated with an account of a user, creation location information indicating a location of the user at a creation time of the token identifier, or other data. A token identifier may be a token identifier that may be used for performing a transaction at a specific location (e.g., user-defined location, location of a user device at the time of creation of the token identifier, or other location). The token 100 may connect with a user device (e.g., wirelessly as illustrated in FIGS. 2 and 3), such as a mobile device or a terminal processing a transaction associated with the token 100, and obtain device location information of the user device. In some embodiments, the device location information may be representative of a geographical location/region of the user device (e.g., latitude and longitude co-ordinates, zip code, city, county, state, country, or other location information). The token 100 may select a first token identifier from the set of token identifiers and switch the first token identifier to an active state to enable transaction processing for the first token identifier. The set of token identifiers may be associated with an account of the user (e.g., checking account, credit card account, or other account of the user). A token identifier may enable the user to perform a transaction at an entity (e.g., a merchant) whose location matches with the creation location information association with the token identifier.

In some embodiments, the token 100 may be any token configured to provide payment information or other transaction-related information to a terminal. In some embodiments, the token 100 may be a card, such as a credit card, a debit card, a payment card, a wallet card, a smart card, a travel pass, or other card. In some embodiments, the token 100 may be a tag, a mobile phone, a wearable device, or other device. In some embodiments, the token 100 may be configured to indicate the status of a transaction associated with the token 100 at a terminal (e.g., terminal 304 illustrated in FIG. 3). In some embodiments, token 100 may have a given length, width, and thickness. In some embodiments, the token 100 may have a body with a length of 80-87 millimeters, a width of 50-57 millimeters, and a thickness of 0.6-0.8 millimeters. In some embodiments, the token 100 may have a maximum thickness of 1 millimeter. As an example, the token 100 may have dimensions that are typical of credit, debit, or other payment cards.

As shown in FIG. 1, a token 100 may include a memory 104, circuitry 106, a display 108, or other components. In some embodiments, the memory 104, the circuitry 106, display 108, or other components of the token 100 may be embedded in the token 100. It should be noted that, while one or more operations are described herein as being performed by particular components of the token 100, those operations may, in some embodiments, be performed by other components of the token 100, components of a user device (e.g., user device 206 illustrated in FIG. 2, a terminal 304 illustrated in FIG. 3), or other components. As an example, while one or more operations are described herein as being performed by the circuitry 106, those operations may, in some embodiments, be performed by components of the user device or transaction terminal.

In some embodiments, memory 104 may store a set of token identifiers that are associated with an account of a user. In some embodiments, each token identifier of the set may be associated with (i) creation location information indicating a location of the user at a creation time of the token identifier, (ii) a time threshold until which the token identifier is valid, or (iii) other information. In some embodiments, the token 100 may be configured to obtain the set of token identifiers from a user device associated with the user (e.g., wirelessly, as illustrated in FIG. 2). In some embodiments, the creation location information may be representative of a geographical location of the user device (e.g., latitude and longitude co-ordinates, zip code, city, county, state, country, or other location information), a user-defined location, or other location.

In some embodiments, the circuitry 106 of the token 100 may be configured to determine a token identifier to be activated based on a current location of the token 100. As an example, if the current location of the token 100 includes a specific zip code, the circuitry 106 may search the memory 104 to select a token identifier associated with creation location information that matches the specific zip code. As another example, if the current location of the token 100 includes a first geographical location, the circuitry 106 may search the memory 104 to select a token identifier associated with creation location information having a geographical location that is in a specified proximity to the first geographical location. The circuitry 106 may be configured to activate (and present) the selected token identifiers (e.g., token identifiers that are associated with creation location information that matches a current location of the token 100). As an example, if a first token identifier is associated with creation location information that matches the location of the token 100, the circuitry 106 may activate the first token identifier. As another example, if more than one token identifier is associated with creation location information that matches the location of the token 100, the circuitry 106 may select and activate one or more of the token identifiers associated with creation location information matching the location of the token 100. In some embodiments, activating a token identifier may include enabling transaction processing for the token identifier (e.g., for performing a transaction at the transaction terminal). In some embodiments, the circuitry 106 may maintain a token identifier stored in memory 104 in an inactive state until the token identifier is activated. The inactive state may correspond to a state in which transaction processing for a token identifier may be disabled.

In some embodiments, the circuitry 106 of the token 100 may be configured to determine a current location of the token 100. As an example, the circuitry 106 may determine the location of the token 100 by connecting (e.g., wirelessly) with a user device, such as a user device 206 (FIG. 2) or a terminal 304 (FIG. 3) and obtaining device location information from the user device as the current location of the token 100. The device location information may be representative of a geographical location of the user device (e.g., latitude and longitude co-ordinates, zip code, city, county, state, country, or other location information). As another example, the circuitry 106 may obtain the current location of the token 100 from a component of the token 100, such as a global positioning system (GPS) receiver.

In some embodiments, the circuitry 106 may interact with the user device (e.g., wirelessly) and may receive power from the user device for performing such interactions. As an example, circuitry 106 may transmit a message including the activated token identifier to the transaction terminal for performing a transaction. As another example, circuitry 106 may receive a message from the transaction terminal indicating a status of the transaction. The status of the transaction may indicate whether a transaction is approved, rejected, card error, or other such status messages. As another example, the circuitry 106 may receive a message having a set of token identifiers from the user device. As another example, the circuitry 106 may transmit a message having location information of the token 100 (e.g., obtained from transaction terminal) to the user device. By way of example, the circuitry 106 may include a signal generator, a processor, a receiver, a transmitter, or other electrical components.

The display 108 may be used to display various information associated with the token 100. As an example, the display 108 may present the token identifiers stored in the memory 104 and their state (e.g., active or inactive). As another example, the display 108 may present a status of the transaction. As another example, information regarding the interactions between the user device and the token 100. By way of an example, the display 108 may include an electrophoretic display, a liquid crystal display (LCD), light emitting diode (LED) display, or other types of display. In some embodiments, the display 108 may be implemented on a surface of the body of the token 100.

In some embodiments, portions of the token 100 may include indicia (e.g., a logo, name, slogan, or other indicia) on the token 100. As an example, the indicia may include identification information associated with owner of the token 100 or institution servicing the token 100.

FIG. 2 shows a system 200 configured to manage token identifiers associated with a user, in accordance with one or more embodiments. The system 200 may include a token 100, computer system 204, user device 206 or other components. The computer system 204 may include one or more computing devices, which collectively act as part of one or more server systems or are themselves user devices. The user device 206 may include any type of mobile terminal, fixed terminal, or other device. By the way of example, the user device 206 may include any computing device, such as a personal computer (PC), a laptop computer, a tablet computer, a hand-held computer, a wearable device, or other computer equipment.

A component of system 200 may communicate with one or more components of system 200 via a communication network (e.g., Internet, a mobile phone network, a mobile voice or data network, a cable network, a public switched telephone network, or other types of communications network or combinations of communications networks). The communication network may be a wireless or wired network. As an example, the user device 206 may interact with the computer system 204 via the above described communication network. As another example, the user device 206 and the token 100 may communicate via a wireless communication network 202 (e.g., using short-range wireless protocols such as Wi-Fi, Bluetooth, near field communication, or other protocols).

It should be noted that, while one or more operations are described herein as being performed by particular components of system 200, those operations may, in some embodiments, be performed by other components of system 200. As an example, while one or more operations are described herein as being performed by components of computer system 204, those operations may, in some embodiments, be performed by components of user device 206.

The computer system 204 may be configured to manage token identifiers associated with a user 210. The user 210 may have an account with an entity associated with the computer system 204 (e.g., a financial institution or other entity) and the token identifiers of the user 210 may be stored in association with the user account. The computer system 204 may provide a token identifier creation user interface (UI), which the user 210 may use to generate a token identifier. In some embodiments, the card creation UI may be accessed via a mobile app associated with the computer system 204 on the user device 206. The user device 206 may access the card creation UI to generate a token identifier (e.g., a number with specified number of digits or other identifier) using the user device 206. The user device 206 may transmit the token identifier to the computer system 204 along with device location information of the user device 206. The computer system 204 may store the token identifier in association with the device location information in a storage system (e.g., a database) associated with the computer system 204. In some embodiments, the device location information may be representative of a geographical location of the user device 206 (e.g., latitude and longitude co-ordinates, zip code, city, county, state, country, or other location information). In some embodiments, the device location information may be user-specified location information instead of the geographical location of the user device 206.

Further, in some embodiments, the token identifier may also be associated with a time threshold relative to a creation time of the token identifier. A time threshold may be a period for which the token identifier may be valid (e.g., may be enabled for transaction processing) from the creation time of the token identifier or an expiration time derived from such creation time and the relative period. As an example, the time threshold may indicate that the token identifier may be valid for a specified number of minutes, hours, days, months, years, or other periods from the creation time of the token identifier. In this way, for example, even if a location-specific token identifier or other virtual token information is breached, the validity of the token information will be limited based on the time threshold, thereby reducing the risk of unauthorized use of the token information from any undetected data breach (e.g., a data breach of a particular merchant system associated with a merchant to which use of the token information is restricted).

In some embodiments, the user 210 may provide the time threshold via the card creation UI. As an example, although a default relative time period (e.g., 24 hours, a week, or other time period) may be initially presented as an option for the time threshold, the user 210 may further limit the time threshold by selecting a shorter relative time period (e.g., 12 hours instead of 24 hours, 2 days instead of a week, etc.) or an earlier expiration time. As another example, the user may modify the time threshold by selecting a longer relative time period or a later expiration time. In some embodiments, token identifiers may provide various benefits. For example, by associating a token identifier with a particular location, such as a creation location of the token identifier (e.g., a zip code, a city, a state, a country or other locations), a user may restrict the usage of the token identifier to the particular location, thereby securing the card against unauthorized access (e.g., by a merchant or other users) from other locations. In another example, by using the token identifiers with a time threshold, a user may be able to further secure the token identifier by setting a custom validity or expiry date for the token identifier. This may restrict the usage of the token identifier not only to a specific location but also for a specific period (e.g., a day, a week, a month, 45 days, one year, or any other period) from a specific time (e.g., from a creation time of the token identifier), thereby securing the card against unauthorized access (e.g., by a merchant or other users) from other locations or outside of the specified period. In another example, the user 210 may also set a spending limit, per transaction-limit, number of transactions limit, or other such restrictions on the token identifier, which restricts the usage of the token identifier not only to a specific location but also to a specific spending limit, per transaction-limit, number of transactions limit or other such restrictions.

While the foregoing paragraph describes the token identifier being generated at the user device 206, in some embodiments, the token identifier may be generated at the computer system 204. As an example, in response to receiving a request for generation of a token identifier, the computer system 204 may generate a token identifier and associate the token identifier with device location information of the user device 206 to generate a token identifier. The device location information or other information (e.g., a time threshold) may be provided to the computer system 204 as part of the request. After the generation of the token identifier, the computer system 204 may transmit the token identifier to the user device 206 for storage at the user device 206.

The user device 206 may transmit the token identifiers to the token 100 (e.g., wirelessly). As an example, the token 100 may synchronize with the user device 206 (e.g., when powered on and is in communication range with the user device 206) to obtain the token identifiers from the user device 206 and store them in the token 100. Each of the token identifiers received from the user device 206 may be associated with creation location information of the corresponding token identifier. In some embodiments, a token identifier received from the user device 206 may also be associated with time threshold. In some embodiments, the token 100 may obtain only those token identifiers that are not already stored in the token 100. In some embodiments, the token 100 may obtain only those token identifiers having creation location information matching a current location of the user device 206. In some embodiments, the token 100 may obtain only those token identifiers that satisfy a time threshold. As an example, at the time of synchronization, if a current time period since the creation of a token identifier (e.g., 14 days or other time period) exceeds a time threshold associated with the token identifier (e.g., 7 days or other time period), then the token 100 may not obtain the token identifier from the user device 206. Thus, in some embodiments, by obtaining a subset of the token identifiers (e.g., those that are valid or enabled for transaction processing) instead of all the token identifiers stored on the user device 206, power, computing resources, network bandwidth and storage resource on the token 100 is minimized.

In some embodiments, the token 100 may be in a "standby" mode (e.g., a mode in which power consumption is below a threshold or most functionalities of token 100 is disabled) and may automatically "wake up" (e.g., change to normal power mode) in response to receiving a signal from the user device 206. In some embodiments, the token 100 may operate when powered by a wireless signal (e.g., a wireless signal from the terminal 304, user device 206 or other devices). For example, a radiofrequency identification (RFID) chip, such as a near-field communication (NFC) chip, or components embedded in the token 100 may operate (e.g., transmit data, receive data, process data, display data, charge embedded power sources, or other operations) when powered by a wireless signal. In some embodiments, the token 100 may have an embedded power source (e.g., a battery, a capacitor, or other components) that may store at least a portion of the received power. In some embodiments, upon receiving power via a wireless signal, the token 100 may activate an embedded power source to perform an operation (e.g., trigger a battery to power the display 108).

The request for creation of the token identifier may originate from the user device 206 or the token 100. As an example, the user device 206 may send the request to the computer system 204 via the user device 206 (e.g., using a mobile app). As another example, the user 210 may initiate a request from the token 100 (e.g., by selecting an input UI element on the token 100), which sends a command indicative of a request for generation of the token identifier to the user device 206. The user device 206 may further transmit the request to the computer system 204.

FIG. 3 shows a system 300 configured to manage transactions with token identifiers, in accordance with one or more embodiments. The system 300 may include a token 100, computer system 204, user device 206, a computer system 302 (e.g., a transaction computer system), a terminal 304 (e.g., a transaction terminal), or other components. The computer system 302 may include one or more computing devices, which may include any type of mobile terminal, fixed terminal, or other device. By the way of example, computer system 302 may include any computing device, such as a personal computer (PC), a laptop computer, a tablet computer, a hand-held computer, other computer equipment. By way of example, the terminal 304 may be any terminal that processes transactions. In some embodiments, the terminal 304 may be an ATM, card readers, transit gates, a toll booth, a device restricting entry, mobile phone, a wearable device, a tablet, a computer, a virtual terminal, a point-of-sale system, a wireless device, or other electronic systems. In some embodiments, transactions associated with token 100 and the terminal 304 may include payments, deposits, access to one or more areas (e.g., a restricted area, public transit, etc.), access to data (e.g., access to a secure virtual environment), or other activities related to transactions.

A component of system 300 may communicate with one or more components of system 300 via a communication network (e.g., Internet, a mobile phone network, a mobile voice or data network, a cable network, a public switched telephone network, or other types of communications network or combinations of communications networks). The communication network may be a wireless or wired network. As an example, the user device 206 may interact with the computer system 204, the terminal 304 may interact with the computer system 302, the computer system 204 may interact with the computer system 302, via the above described communication network. As another example, the user device 206, the terminal 304 and the token 100 may communicate via a wireless communication network 202 (e.g., using short-range wireless protocols such as Wi-Fi, Bluetooth, near field communication, or other protocols).

It should be noted that, while one or more operations are described herein as being performed by particular components of system 300, those operations may, in some embodiments, be performed by other components of system 300. As an example, while one or more operations are described herein as being performed by components of computer system 204, those operations may, in some embodiments, be performed by components of the computer system 302.

In some embodiments, the token 100 may engage in interactions with the terminal 304 by being in direct contact with the terminal 304. In some embodiments, the token 100 may engage in interactions with the terminal 304, when the token 100 is within a certain communication range (e.g., up to 5 inches or other communication range).

In some embodiments, the interactions may be unidirectional or bidirectional between the token 100 and the terminal 304. In some embodiments, interactions may include the token 100 being powered by the terminal 304. In some embodiments, the interactions may include the token 100 receiving communications from the terminal 304, such as a data transmission or a command. As an example, a data transmission may be a confirmation of successful payment transmitted from the terminal 304 to the token 100. As a further example, the command may be a protocol parameter selection command transmitted from the terminal 304 to the token 100. In some embodiments, the interactions may include communications transmitted from the token 100 to the transaction terminal, such as a data transmission or a request. As an example, a data transmission may include transmission of credit card details (e.g., a card identifier transmitted from the token 100 to the terminal 304, an expiration time, or other details). As a further example, a request may be a request to make a payment from the token 100 to the terminal 304.

In some embodiments, the token 100 may determine a token identifier to be transmitted to the terminal 304 based on a current location of the token 100. As described above, the location of the token 100 may be determined in a number of ways. For example, the token 100 may connect with the user device 206 (e.g., by establishing a wireless connection) to obtain the device location information of the user device 206 as the current location of the token 100. In another example, the token 100 may connect with the terminal 304 (e.g., wirelessly) to obtain the device location information of the terminal 304 as the current location of the token 100. In yet another example, the token 100 may obtain the current location of the token 100 from an on-board component of the token 100, such as a GPS receiver embedded in the token 100.

After obtaining the location information of the token 100, the token 100 may select from a storage associated with the token 100 (e.g., memory 104) a token identifier associated with creation location information that matches the current location of the token 100. The token 100 may activate the selected token identifier and transmit the token identifier to the transaction terminal for processing a transaction performed by the user 210.

The terminal 304 sends the transaction information, including the token identifier, transaction amount, transaction date and time, or other information, to the computer system 302. Upon receiving the transaction information, the computer system 302 may generate a card verification request and transmit the card verification request to the computer system 204 for verification of the token identifier. The card verification request may include the transaction information, along with an identifier (e.g., merchant ID) of an entity associated with the terminal 304, location information of the entity (e.g., merchant location information) or other information. Upon receiving the card verification request, the computer system 204 obtains, from a storage associated with the computer system 204, creation location information associated with the token identifier received in the request and determines whether the location information of the entity matches the creation location information. In some embodiments, the card verification request may not include location information of the entity in which case the computer system 204 may obtain the location information of the entity from the storage associated with the computer system 204 based on the merchant ID in the request.

The computer system 204 may send an approval message based on the location information of the entity matching the creation location information, and the computer system 204 may send a rejection message indicating that the computer system 302 based on the location information of the entity not matching the creation location information. As an example, if the computer system 204 determines that the location information of the entity matches the creation location information, the computer system 204 may send an approval message indicating that the computer system 302 should complete the transaction. If the computer system 204 determines that the location information of the entity does not match the creation location information, the computer system 204 may send a rejection message indicating that the computer system 302 should decline the transaction. The terminal 304 may process the transaction (e.g., complete or decline) based on the message from the computer system 302.

In some embodiments, the criterion for determining whether two locations match may be defined by a user (e.g., an entity associated with the computer system 204 or another entity). As an example, two locations may be considered to be matching if at least a portion of the location information matches (e.g., street, zip code, county, city, or other location information portions from both the locations match). As an example, two locations may be considered to be matching if they are within a predefined proximity (e.g., within a 5-mile radius, 10-mile radius, or any other proximity).

In some embodiments, the computer system 204 may also verify a time threshold associated with token identifier in order to determine whether to send an approval message or rejection message. For example, upon receiving the card verification request, the computer system 204 may obtain the token identifier information from the storage and determine if the token identifier is associated with a time threshold. If the token identifier is associated with a time threshold, the computer system 204 may determine if the transaction time associated with the token identifier satisfies the time threshold. As an example, if the period that has elapsed from the creation time of the token identifier to the transaction time (e.g., 5 days or other time period) has not exceeded a time threshold associated with the token identifier (e.g., 7 days or other time period), then the computer system 204 may determine the token identifier to be valid and send an approval message accordingly.

Example Flowchart(s)

The example flowchart(s) described herein of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 4:
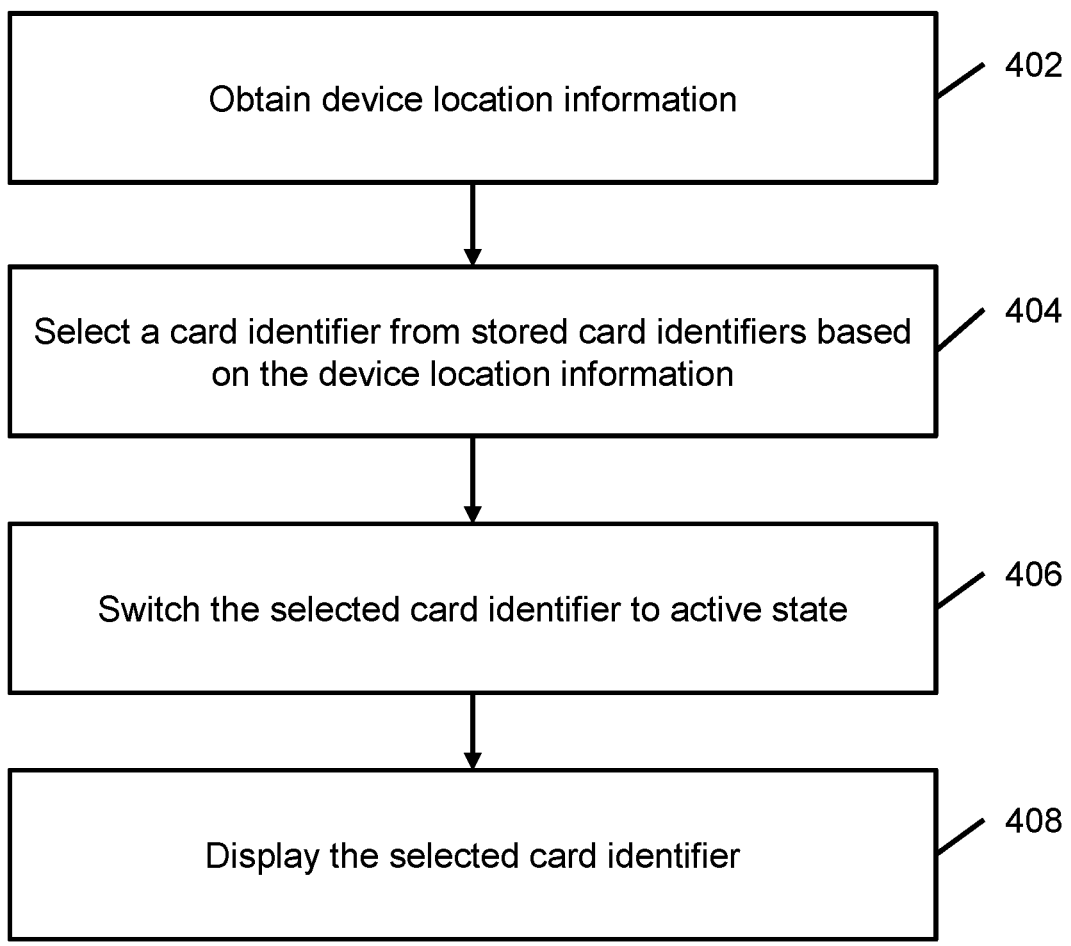
FIG. 4 shows a flowchart of a method of facilitating activation of a location-specific card identifier, in accordance with one or more embodiments.

FIG. 4 shows a flowchart of a method 400 of facilitating activation of a location-specific card identifier, in accordance with one or more embodiments. In an operation 402, device location information of a user device (e.g., user device 206, terminal 304, or other device) is obtained by the transaction card. In some embodiments, the device location information may be representative of a geographical location of the user device (e.g., latitude and longitude co-ordinates, zip code, city, county, state, country, or other location information). The token 100 may obtain the device location information wirelessly (e.g., using Bluetooth, or other short-range wireless protocol). In some embodiments, the token 100 may perform the operation 402 in response to receiving power or communications (e.g., from a terminal 304 during a transaction, a user device 206, or other device).

In an operation 404, location-specific card identifiers stored in a storage associated with the token 100 (e.g., memory 104) may be processed to select a location-specific card identifier associated with creation location information that matches the device location information.

In an operation 406, the selected location-specific card identifier may be switched from an inactive state to an active state. In some embodiments, an active state corresponds to a state in which transaction processing is enabled for the location-specific card identifier, and an inactive state corresponds to a state in which transaction processing is disabled for the location-specific card identifier.

In an operation 408, the location-specific card identifier is displayed on a display associated with the token 100. In some embodiments, the token 100 may transmit the location-specific card identifier to a transaction terminal (e.g., terminal 304) for processing a transaction performed by the user 210.

Operations 402-408 may be performed by a component that is the same as or similar to circuitry 106, in accordance with one or more embodiments.

Figure 5:
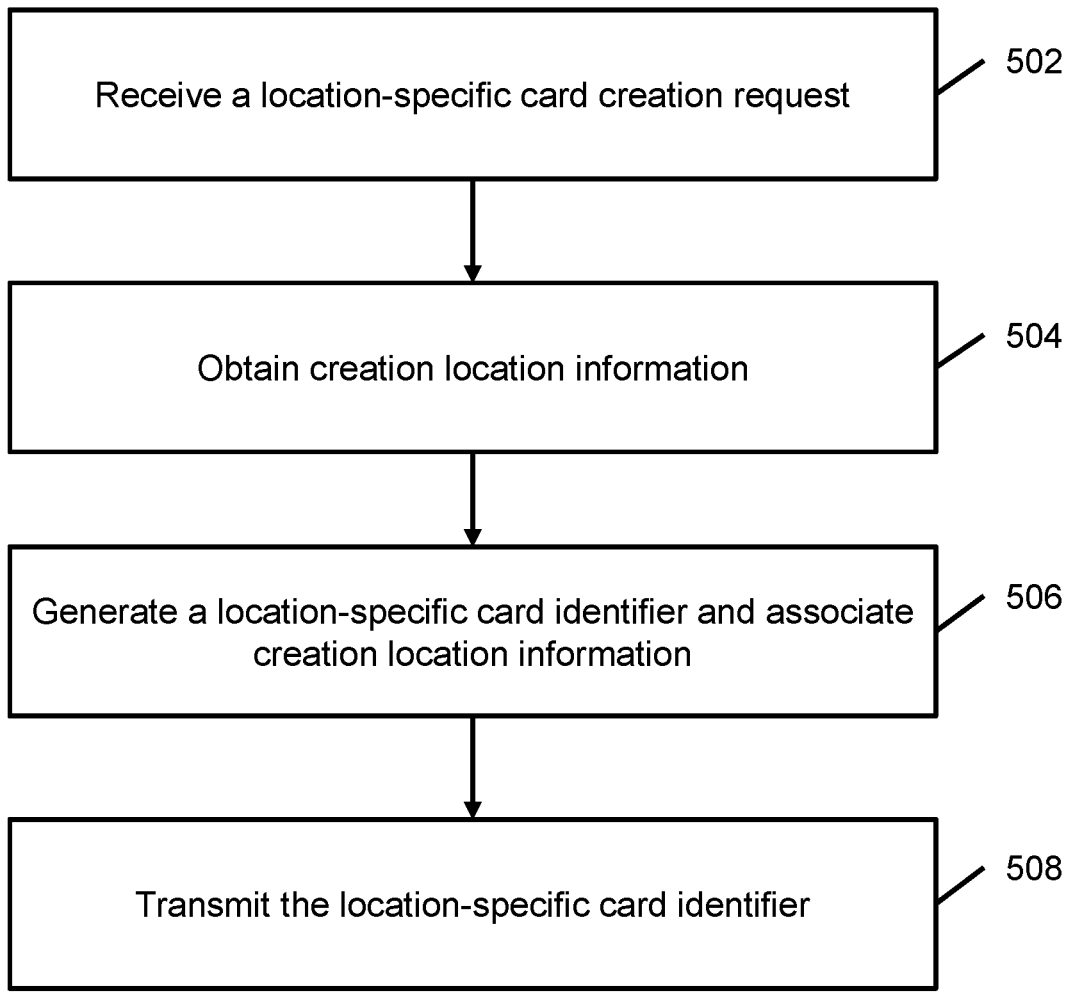
FIG. 5 shows a flowchart of a method for facilitating creation of a location-specific card identifier, in accordance with one or more embodiments.

FIG. 5 shows a flowchart of a method 500 for facilitating creation of a location-specific card identifier, in accordance with one or more embodiments. In an operation 502, a card creation request for generation of a location-specific card identifier is received. For example, the request may be issued using the user device 206 (e.g., via a mobile app associated with the computer system 204) or from the token 100 (e.g., via user selection of an input UI element on the transaction card which transmits a command to the user device 206).

In an operation 504, device location information of the user device 206 or terminal 304 is obtained. The device location information may be representative of a geographical location of the user device (e.g., latitude and longitude co-ordinates, zip code, city, county, state, country, or other location information). In some embodiments, the device location information may be user-defined location information. In some embodiments, the device location information may be included in the card creation request. Further, in some embodiments, a time threshold relative to a creation time of the card identifier may also be provided as part of the card creation request. A time threshold may be a relative period for which the card identifier may be valid (e.g., may be enabled for transaction processing) from the creation time of the location-specific card identifier or an expiration time derived from such creation time and the relative period. As an example, the time threshold may indicate that the card identifier may be valid for a specified number of minutes, hours, days, months, years, or other periods from the creation time of the card identifier.

In an operation 506, a card identifier is generated and stored in a storage system (e.g., a database) associated with the computer system 204 in association with the device location information. In some embodiments, the location-specific card identifier may also be associated with the time threshold or an expiration time derived from the time threshold.

In an operation 508, the location-specific card identifier may be transmitted to the user device 206 for storage at the user device 206. Additionally, or alternatively, other information associated with the location-specific card identifier may be transmitted to the user device 206 for storage at the user device 206, such as creation location information (e.g., a device location of the user at a creation time of the card identifier), the time threshold, etc.

Operations 502-508 may be performed by a component that is the same as or similar to the computer system 204, in accordance with one or more embodiments.

Figure 6:
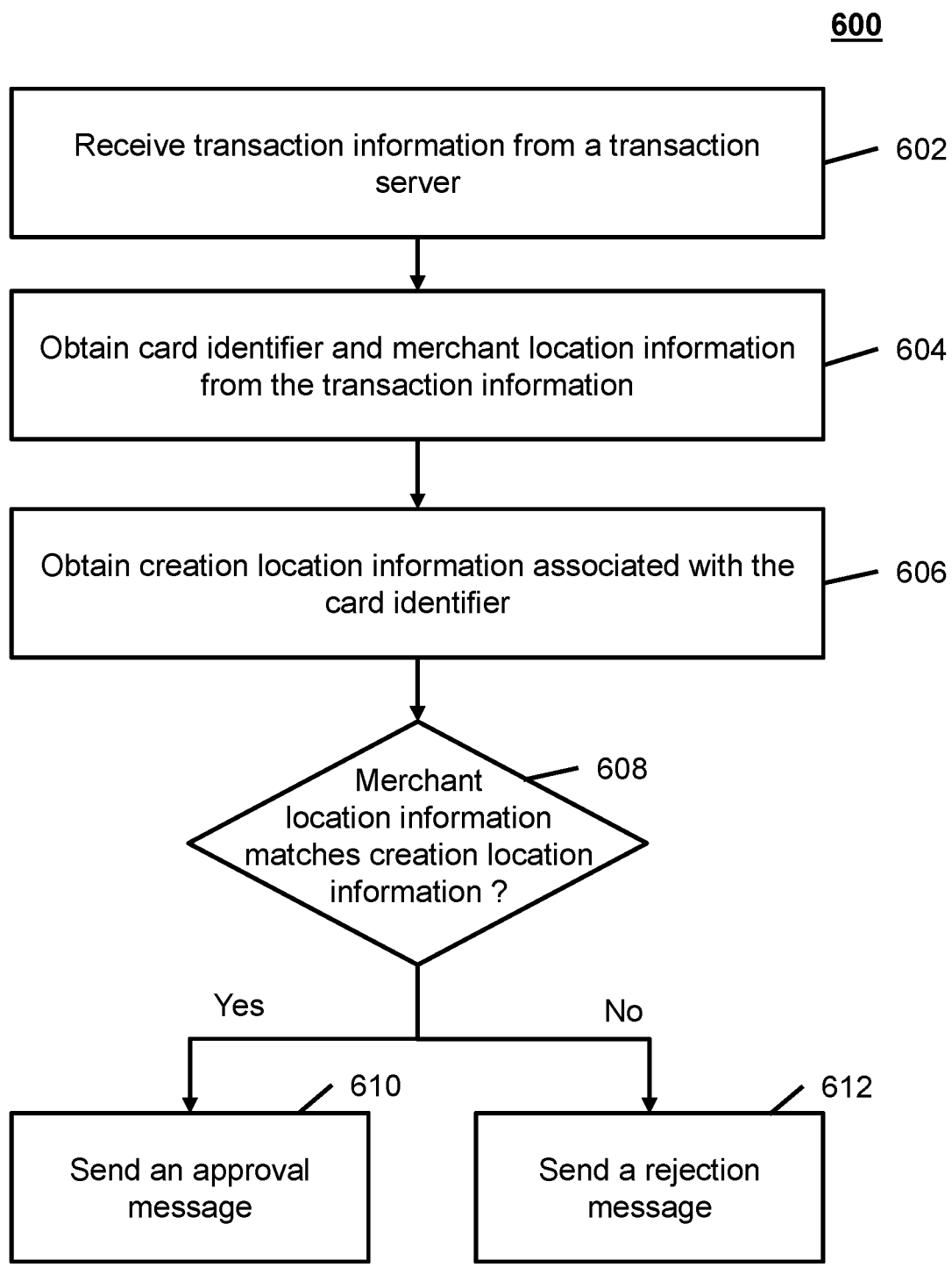
FIG. 6 shows a flowchart of a method for facilitating the use of a location-specific card identifier to perform data processing, in accordance with one or more embodiments.

FIG. 6 shows a flowchart of a method 600 for facilitating the use of a location-specific card identifier to perform data processing, in accordance with one or more embodiments. In an operation 602, transaction information is received from a transaction computer system (e.g., computer system 302) associated with a transaction terminal (terminal 304) at which a transaction is performed using the token 100. In some embodiments, the transaction information includes a location-specific card identifier used in the transaction, transaction amount, transaction date and time along with a merchant ID associated with the terminal 304, transaction location information (e.g., merchant location information of a merchant where the transaction was performed), or other information. In some embodiments, merchant location information is indicative of a geographical location at which the merchant associated with the terminal 304 is located.

In an operation 604, the location-specific card identifier and the merchant location information is obtained from the transaction information. In some embodiments, the merchant location information may be obtained from a merchant record stored in a storage system (e.g., database) associated with the computer system 204 using the merchant ID.

In an operation 606, the creation location information of the location-specific card identifier may be obtained from location-specific card identifier information stored in a storage system (e.g., database) associated with the computer system 204.

In an operation 608, a determination is made whether the merchant location information matches the creation location information. In some embodiments, the criterion for determining whether two locations match may be defined by a user (e.g., an entity associated with the computer system 204 or another entity). As an example, two locations may be considered to be matching if at least a portion of the location information matches (e.g., street, zip code, county, city or other location information portions from both the locations match). As an example, two locations may be considered to be matching if they are within a predefined proximity (e.g., within a 5-mile radius, 10-mile radius, or other proximity).

In an operation 610, an approval message is sent to the computer system 302 based on the merchant location information matching the creation location information. The approval message may cause the terminal 304 to complete the transaction using the location-specific card identifier. In some embodiments, the token 100 may obtain the transaction status from the terminal 304 and display the status (e.g., in display 108). As an example, the token 100 may display a message "Transaction Successful" indicating the transaction completed successfully.

In an operation 612, a rejection message is sent to the computer system 302 based on the merchant location information not matching the creation location information. The rejection message may cause the terminal 304 to decline the transaction. In some embodiments, the token 100 may display the transaction status (e.g., in display 108). As an example, the token 100 may display a message "Transaction Declined" indicating the transaction was declined. In some embodiments, the transaction status may also display a reason for the transaction to be declined. For example, the token 100 may display a message "Card not enabled for location" indicating that the card identifier is not enabled for the location. In some embodiments, the user device 206 may also display above the transaction status. The user device 206 may also display the location the card identifier is enabled for.

In some embodiments, the various computers and subsystems illustrated in FIG. 2 may include one or more computing devices that are programmed to perform the functions described herein. The computing devices may include one or more electronic storages (e.g., database(s) or other electronic storages), one or more physical processors programmed with one or more computer program instructions, and/or other components. The computing devices may include communication lines or ports to enable the exchange of information within a network or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical-charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. It should be appreciated that the description of the functionality provided by the different components or subsystems described herein is for illustrative purposes, and is not intended to be limiting, as any of such components or subsystems may provide more or less functionality than is described.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining device location information of a user device; selecting a card identifier from a set of card identifiers associated with location information matching the device location information; and switching the selected card identifier to an active state, which enables processing for the card identifier.

2. The method of embodiment 1, wherein the user device includes a mobile device associated with a user, wherein the device location information is indicative of a location of the mobile device.

3. The method of embodiment 1, wherein the user device location includes a terminal associated with a merchant, wherein the device location information is indicative of a location of the terminal.

4. The method of any of embodiments 1-3, wherein the device location information is obtained via a wireless connection.

5. The method of embodiment 1, wherein the device location information includes user-specified location information.

6. The method of any of embodiments 1-4, wherein the device location information is obtained responsive to receiving power via a signal from the user device.

7. The method of any of embodiments 1-6, further comprising: transmitting the selected card identifier to a terminal associated with a merchant.

8. The method of any of embodiments 1-7, further comprising: obtaining a new card identifier from a user device.

9. The method of embodiment 8, wherein the new card identifier is associated with creation location information of the new card identifier.

10. The method of embodiment 9, wherein the creation location information is indicative of a location of a user device at a creation time of the new card identifier.

11. The method of any of embodiments 1-10, wherein a first card identifier of the set is associated with a time threshold related to a creation time of the first card identifier.

12. The method of embodiment 1, further comprising: switching the card identifier to an inactive state based on the device location information not matching the location information of the card identifier, wherein the inactive state corresponds to a state for which processing is disabled for the card identifier.

13. The method of any of embodiments 1-12, further comprising: switching the card identifier to an inactive state based on a transaction time of a transaction performed using the card identifier not satisfying a time threshold associated with the card identifier.

14. The method of any of embodiments 1-13, wherein the set of card identifiers are obtained by synchronizing the card with at least one user device, wherein the synchronizing obtains those card identifiers (from the at least one user device) that are associated with creation location information matching the device location information.

15. The method of any of embodiments 1-14, wherein the obtaining of the device location information, the selection of the card identifier, or the switching is performed by a card.

16. The method of embodiment 15, further comprising: presenting the card identifier on a display of the transaction card.

17. The method of any of embodiments 15-16, further comprising: presenting a state of the card identifier on a display of the transaction card.

18. The method of any of embodiments 15-17, wherein the card comprises a credit card, a debit card, a transit pass, or an access card.

19. The method of any of embodiments 15-18, wherein the card has a length of 80 mm-87 mm, a width of 50 mm-57 mm, and a thickness of 0.6 mm-0.8 mm.

20. A tangible, non-transitory, machine-readable media storing instructions that, when executed by an apparatus, cause the apparatus to effectuate operations comprising those of any of embodiments 1-19.

21. A system comprising: one or more processors; and memory storing instructions that, when executed by the processors, cause the processors to effectuate operations comprising those of any of embodiments 1-19.

22. An apparatus (e.g., token) that performs the operations of any of embodiments 1-19.

What is claimed is:

1. A card for storing and presenting a location-specific card identifier based on a corresponding device location, the card comprising:
    a memory;
    a display;
    circuitry performing operations comprising:
        receiving from a user device a request to generate a first location-specific card identifier;
        obtaining device location indicating a creation location at which the user device is located, a creation time information during which the first location-specific card identifier is generated, and a restriction information comprising an account of a user;
        generating the first location-specific card identifier;
        adding the first location-specific card identifier to a set of location-specific identifiers stored in the memory;
        subsequently obtaining, from the user device, (i) device location information indicating a location at which the user device is located and (ii) time information indicating a current time;
        selecting, from the set of location-specific card identifiers stored on the memory, the first location-specific card identifier to be in an active state based on the device location information matching the location of the user at the creation time of the location-specific card identifier and the time information, wherein the active state corresponds to a state in which processing is enabled for a card identifier;
        switching the first location-specific card identifier from an inactive state to the active state based on the selection; and
        causing the display to present the first location-specific card identifier based on the first location-specific identifier being in the active state.

2. The card of claim 1, wherein the operations further comprise:
    establishing a wireless connection with the user device;
    receiving a request from the user device to generate a second location-specific card identifier; and
    obtaining from the user device, in connection with the request to generate the second location-specific card identifier, (i) a first account, (ii) a first time at which the wireless connection was established, (iii) a time threshold.

3. The card of claim 2, wherein the operations further comprise:
    generating the second location-specific card identifier to be associated with a user account, a creation time, and an expiration parameter, wherein the user account may be the first account, the creation time may be the first time, and the expiration parameter may be the time threshold.

4. The card of claim 3, wherein the operations further comprise:
    based on comparing a current time to the first time, determine that the time threshold has elapsed; and
    based on determining that the time threshold has elapsed, disabling the second location-specific card identifier.

5. A method for storing and presenting a location-specific card identifier based on a corresponding device location, the method comprising:
    using a card with a memory and a display, receiving from a user device a request to generate a first location-specific card identifier;
    obtaining device location indicating a creation location at which the user device is located, a creation time information during which the first location-specific card identifier is generated, and a restriction information comprising an account of a user;
    generating the first location-specific card identifier;
    adding the first location-specific card identifier to a set of location-specific identifiers stored in the memory of the card;
    subsequently obtaining, from the user device, (i) device location information indicating a location at which the user device is located and (ii) time information indicating a current time;
    selecting, from the set of location-specific card identifiers stored on the memory of the card, the first location-specific card identifier to be in an active state based on the device location information matching the location of the user at the creation time of the location-specific card identifier and the time information, wherein the active state corresponds to a state in which processing is enabled for a card identifier; and
    switching the first location-specific card identifier from an inactive state to the active state based on the selection.

6. The method of claim 5, further comprising:
    presenting, using an electrophoretic display of the card, information regarding the first location-specific card identifier based on the first location-specific card identifier being in the active state.

7. The method of claim 5, wherein the user device includes a mobile device associated with the user.

8. The method of claim 7, further comprising: obtaining, from the user device, a new location-specific card identifier responsive to creation of the new location-specific card identifier.

9. The method of claim 8, wherein the new location-specific card identifier is associated with creation location information, which includes location information that is representative of a location at which the user device is located at a creation time of the new location-specific card identifier.

10. The method of claim 8, wherein the new location-specific card identifier is associated with a time threshold related to the creation time of the new location-specific card identifier.

11. The method of claim 5, further comprising: switching the first location-specific card identifier to an inactive state based on (i) the device location information not matching the creation location information or (ii) a current time not satisfying a time threshold associated with the first location-specific card identifier, wherein the inactive state corresponds to a state in which transaction processing is disabled for a location-specific card identifier.

12. The method of claim 5, wherein the creation location information includes user-specified location information that is representative of a location specified by the user at a creation time of the corresponding location-specific card identifier.

13. The method of claim 5, wherein the card comprises a credit card, a debit card, a travel pass, or a payment token.

14. A non-transitory computer-readable medium comprising instructions that, when executed by one or more processors, cause operations comprising:
receiving from a user device a request to generate a first location-specific card identifier;
obtaining device location indicating a creation location at which the user device is located, a creation time information during which the first location-specific card identifier is generated, and a restriction information comprising an account of a user;
generating the first location-specific card identifier;
adding the first location-specific card identifier to a set of location-specific identifiers;
subsequently receiving a second request from the user device, wherein the second request is a request to set the first location-specific card identifier to an active state, and wherein the second request comprises a second location;
determining that the second location corresponds to the creation location of the first location-specific card identifier; and
switching the first location-specific card identifier from an inactive state to the active state.

15. The computer-readable medium of claim 14, wherein the operations further comprise:
presenting information regarding the first location-specific card identifier based on the first location-specific card identifier being in the active state.

16. The computer-readable medium of claim 14, wherein obtaining the device location includes:
establishing a wireless connection with the user device; and
obtaining the device location from the user device.

17. The computer-readable medium of claim 14, wherein the operations further comprise:
obtaining, from the user device, a new location-specific card identifier responsive to creation of the new location-specific card identifier.

18. The computer-readable medium of claim 17, wherein the new location-specific card identifier is associated with creation location information, which includes device location information that is representative of a location at which the user device is located at a creation time of the new location-specific card identifier.

19. The computer-readable medium of claim 17, wherein the new location-specific card identifier is associated with a time threshold related to the creation time of the new location-specific card identifier.

20. The computer-readable medium of claim 14, wherein the operations further comprise:
synchronizing, with the user device, to obtain one or more location-specific card identifiers having creation location information matching the device location information.

* * * * *